Patented Apr. 12, 1932

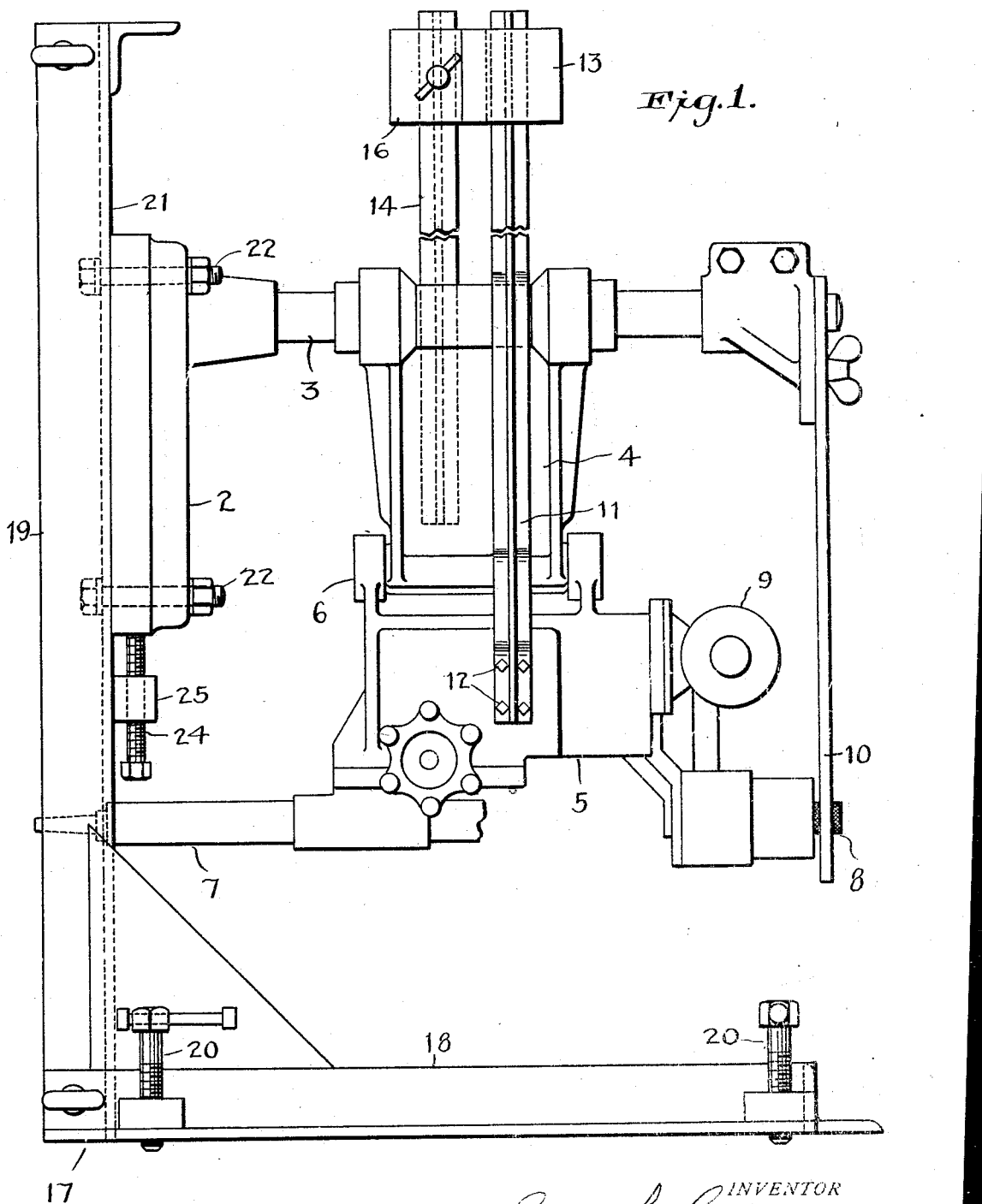

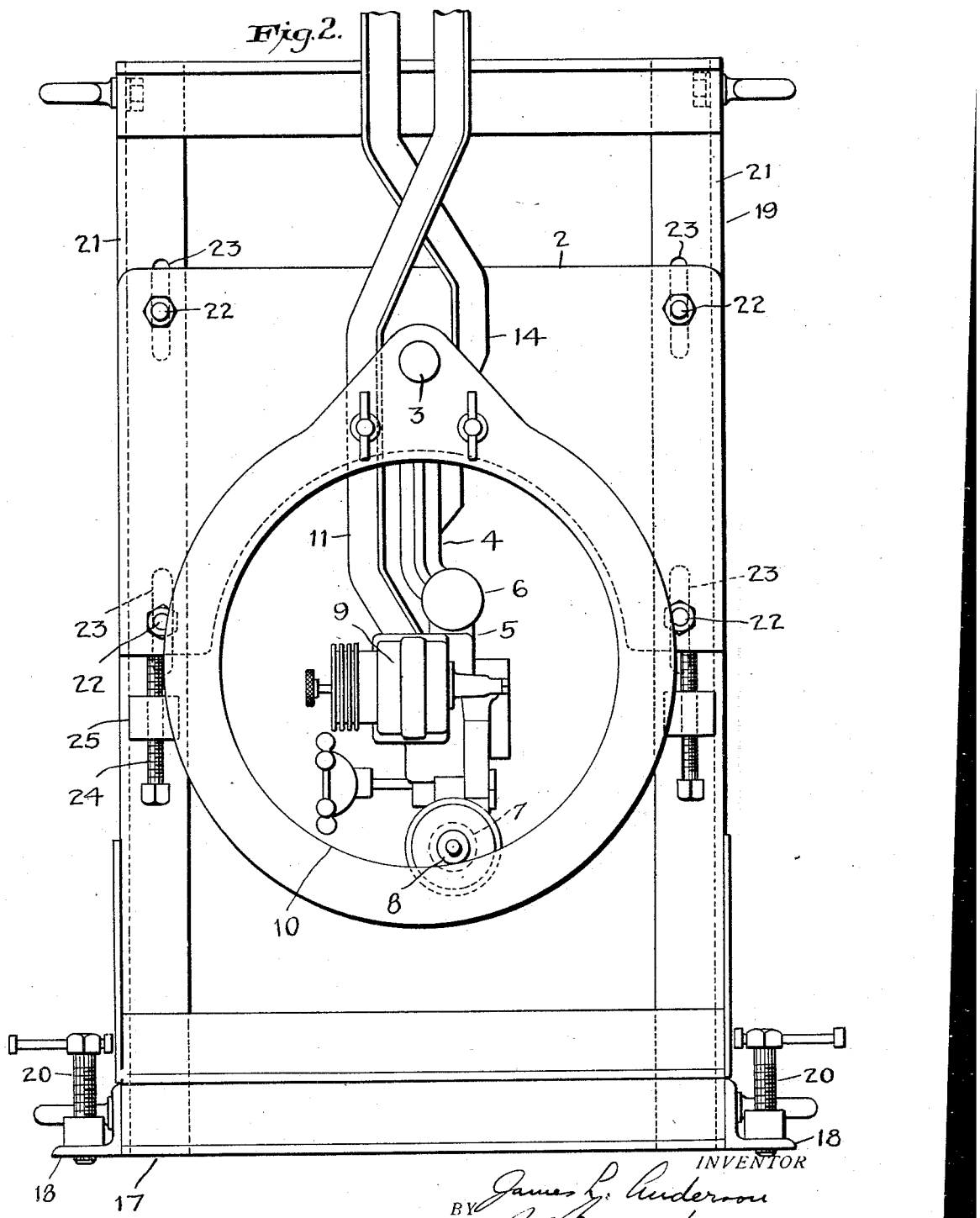

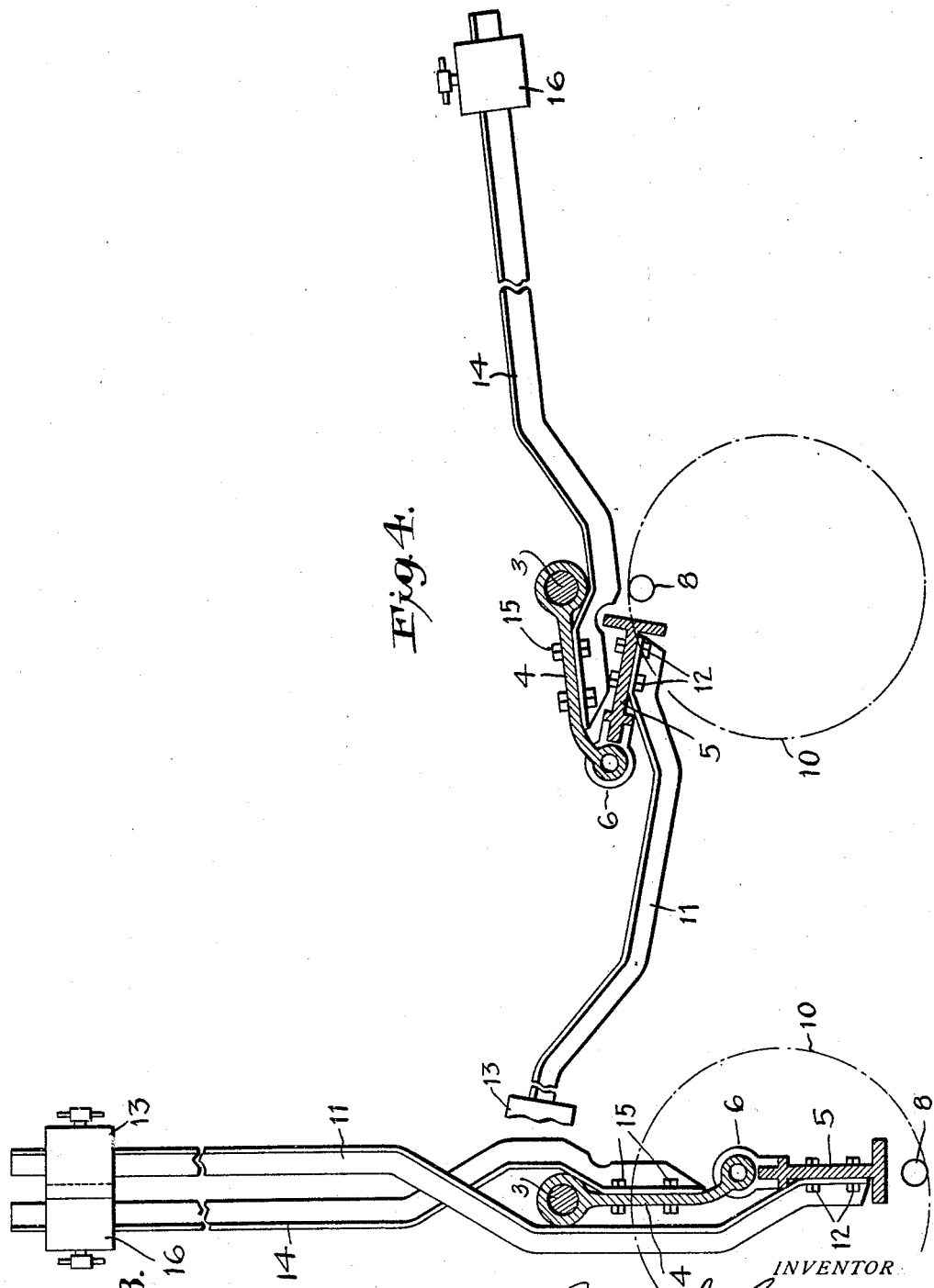

1,853,026

UNITED STATES PATENT OFFICE

JAMES L. ANDERSON, OF TENAFLY, NEW JERSEY, ASSIGNOR TO AIR REDUCTION COMPANY, INCORPORATED, OF NEW YORK, N. Y., A CORPORATION OF NEW YORK

TORCH CUTTING MACHINE

Application filed December 6, 1930. Serial No. 500,508.

The invention has to do with the cutting of metal by the oxygen stream, and relates to universal torch cutting machines by means of which one or more torches can be propelled at uniform speed in any and changing directions in a plane, to execute cuts of any desired shape. Such machines have been designed to operate in a horizontal plane, and the purpose of the present invention is to make it possible to employ a machine of this character for cutting work disposed in a vertical plane.

The invention includes the provision of means for supporting the machine to operate in relation to work in a vertical plane, and means for counterbalancing the movable structure of the machine so that the motor-driven tracer is relieved of any undue loading when traveling upward and, on the other hand, is not accelerated or caused to slip when traveling downward. In this way, the evenness and uniformity of movement of the torch, so essential to clean and accurate cutting, are insured.

Machines may be specially constructed in accordance with the invention to do vertical cutting only, but a further object is to provide means for adapting a universal torch machine so that it can be used either for horizontal or for vertical cutting. Combining these capabilities in one and the same machine is an advantage of great practical value.

The preferred embodiment of the invention therefore includes a mounting to which a horizontal cutting machine can be applied, in order to support and adjust the machine for vertical cutting. When the machine is removed from this mounting it will stand on its own base to operate in the ordinary way.

In the accompanying drawings, forming part hereof:

Fig. 1 is a side elevation of a machine and mounting, illustrating a form of execution of the invention, portions of the counterbalance arms intermediate their ends being broken out;

Fig. 2 is a front elevation, portions of the counterbalance arms with the weights carried thereby being broken away; and Figs. 3 and 4 are simplified sectional elevations looking at right angles to Fig. 1, showing the jointed torch and tracer-carrying arm in the most extended condition and in the most closely folded condition, respectively, together with the positions occupied by the weighted counterbalance arms.

The invention is concerned more specifically with an adaptation of the type of universal cutting machine illustrated in Patent No. 1,324,007, dated December 2, 1919, in which there is a pivotally jointed arm swung from a post, the outer section of this arm carrying the torch and the motor-driven tracer, these being preferably in approximate axial alinement with each other.

The numeral 2 designates the base of such a machine, this base being designed to rest on the floor when the machine is used for horizontal cutting. The post 3 rises vertically from the base when the machine is placed for horizontal cutting, and extends horizontally when the machine is mounted for vertical cutting.

The arm of the machine comprises an inner section 4 swung on the post and an outer section 5 connected to the inner section by a pivot joint 6. The arm can accordingly be flexed or extended after the manner of an elbow, and in addition can swing about the principal center, these motions giving all the flexibility required to enable the torch 7 and coaxial tracer 8 to move in straight lines or along curves of all kinds or to move in angular courses. The tracer is preferably of the magnetic type, driven by an electric motor 9, and cooperates with a suitable template 10 which is applied to the end of the post.

If an ordinary machine were supported with the post horizontal, the heavy pendant weight of the jointed arm and of the parts which it carries would make it impossible for the tracer to follow the template and propel the torch at uniform speed. Under this invention the difficulty has been overcome by, first, balancing the arm section 5 so that an average condition is arrived at which allows free motion in all directions without undue loading, and by, second, counterbalancing the whole assembly so that again an average condition is obtained which allows the torch and tracer to move in all directions without tendency to slip at any point.

In effecting this counterbalancing, it has been necessary to dispose the counterbalance devices so that they do not interfere with the sections of the arm in their folding, straightening and swinging movements, or with the principal pivot joint from which the entire arm is carried.

The forward part of a long counterbalance arm 11 is detachably secured by bolts 12 to one side of the arm section 5 which carries the torch and tracer. This counterbalance arm extends rearward past the pivot 6, and past the post 3 when the arm of the machine is in the outward position shown in Fig. 3, and the arm 11 is bent to clear all relatively movable parts. A weight 13 adjustable on the rear portion of the arm 11 enables the counterbalancing of the arm section 5 to be regulated.

The forward part of another counterbalance arm 14 is detachably affixed to one side of the arm section 4 by bolts 15. The arrangement is preferably such that the two counterbalance arms are applied, respectively, to opposite sides of the two arm sections 4 and 5 when these sections are extended. Furthermore, the counterbalance arms 11 and 14 are disposed in different planes, so that they do not interfere with each other. The arm 14 is likewise bent, and at a distance behind the post 3 it carries an adjustable weight 16. The counterweighting of the arms 11 and 14 might be fixed or inherent, depending upon their length and the distribution of their masses, but the provision of adjustable counterweights is desirable.

When the arms 11 and 14 are applied and the weights 13 and 16 are properly set, the movable structure of the machine is balanced so that the machine can operate successfully to cut in the vertical position shown in the drawings.

In connection with the machine thus equipped, a special mounting 17 is provided. A simple and preferred embodiment of the mounting comprises a base 18 of sufficient extent to give stability when the machine is supported in an overhanging, pendent relation, and an open frame 19 rising from the back of said base and rigidly braced thereto. The base 18 may be provided with leveling means 20.

The base 2 of the machine is detachably secured to the side members 21 of the frame 19 by bolts 22, which take into vertical slots 23 in the said members. Vertical screws 24 threaded through lugs 25 projecting from the side members of the frame, sustain the base 2 and provide for vertical adjustment of the machine in its vertical cutting position.

While the use of the invention for vertical cutting has been referred to, it will be evident that the invention is equally applicable to the cutting of work lying in an inclined plane. In that event, the part 19 of a mounting such as illustrated would be set at an inclination to the base 18 instead of perpendicularly. Consequently, references to vertical cutting, vertical planes and the like are to be understood in an illustrative sense.

It will be understood that there may be numerous changes in the form of execution of the invention.

I claim:

1. In combination with a universal torch cutting machine of the sectional, pivotally-jointed arm type operated by a motor-driven tracer, means for supporting the machine to operate in relation to work in a vertical plane, and weighted counterbalance arms applied to the two sections of the jointed arm of the machine so as to insure free motion in all directions without undue resistance or slipping at any point in the travel of the tracer.

2. The combination with a universal torch cutting machine of the sectional, pivotally-jointed arm type operated by a motor-driven tracer, of means for supporting the machine to operate in relation to either work in a horizontal plane or work in a vertical plane, weighted counterbalance arms adapted to be applied to the two sections of the jointed arm of the machine when the machine is disposed for vertical cutting, and means for securing said counterbalance arms to said sections in a detachable manner.

3. The combination with a universal torch cutting machine comprising a post, and a sectional, pivotally-jointed arm swung on said post and carrying the torch and a motor-driven tracer; of a supporting base to rest on a horizontal surface, and a frame rising from said base, to which frame said post is secured in a horizontal position.

4. The combination with a universal torch cutting machine comprising a post, and a sectional pivotally-jointed arm swung on said post and carrying the torch and a motor-driven tracer; of a supporting base to rest on a horizontal surface, a frame rising from said base, to which frame and post is secured in a horizontal position, and connections for adjustably securing said post to said frame so that the post projects horizontally and can be adjusted vertically.

5. The combination with a universal torch cutting machine comprising a supporting base adapted to rest when desired on a horizontal surface so that the machine will operate in relation to work in a horizontal plane, a post projecting from said base, and a sectional pivotally-jointed arm swung on said post and carrying the torch and a motor-driven tracer, of an additional supporting base, a frame rising from said additional base, and connections for detachably securing the base of the machine to said frame so that the machine will then operate in relation to work in a vertical plane.

6. The combination with a universal torch cutting machine comprising a supporting base adapted to rest when desired on a horizontal surface so that the machine will operate in relation to work in a horizontal plane, a post projecting from said base, and a sectional pivotally-jointed arm swung on said post and carrying the torch and a motor-driven tracer, of an additional supporting base, a frame rising from said additional base, connections for detachably securing the base of the machine to said frame so that the machine will then operate in relation to work in a vertical plane, said connections being adapted to permit the base of the machine to be adjusted vertically on said frame, and screws on the frame for raising and lowering said base.

7. In a universal torch cutting machine, the combination of a torch and a motor-driven electromagnetic tracer, a freely movable structure supporting said torch and tracer for universal movement in a plane, said tracer having a roller to adhere to the boundary of a template, means for supporting said freely movable structure to operate in a vertical plane, and means for counterbalancing the freely movable structure so as to insure uniform movement of the magnetic roller on the template.

8. In a universal torch cutting machine, the combination of a freely movable jointed-arm structure, a pivotal support for one part of said jointed arm structure, a torch and a motor-driven electromagnetic tracer carried by another part of said structure, said tracer having a roller to adhere to the boundary of a template, means for supporting said pivotal support so that the jointed arm structure will operate in vertical planes, and means for counterbalancing the parts of said structure so as to insure uniform movement of the magnetic roller on the template.

JAMES L. ANDERSON.